US008311656B2

(12) United States Patent
Carrier

(10) Patent No.: US 8,311,656 B2
(45) Date of Patent: Nov. 13, 2012

(54) MUSIC AND AUDIO PLAYBACK SYSTEM

(75) Inventor: Chad M. Carrier, Whittier, CA (US)

(73) Assignee: inMusic Brands, Inc., Cumberland, RI (US)

(*) Notice: Subject to any disclaimer, the term of this patent is extended or adjusted under 35 U.S.C. 154(b) by 1132 days.

(21) Appl. No.: 11/824,383

(22) Filed: Jun. 29, 2007

(65) Prior Publication Data

US 2008/0013757 A1 Jan. 17, 2008

Related U.S. Application Data

(60) Provisional application No. 60/830,870, filed on Jul. 13, 2006.

(51) Int. Cl.
G06F 17/00 (2006.01)

(52) U.S. Cl. ........................................................ 700/94

(58) Field of Classification Search .................. 381/119; 700/94; 369/4
See application file for complete search history.

(56) References Cited

U.S. PATENT DOCUMENTS 6,546,299 B1    4/2003  Bradley
7,012,184 B2    3/2006  Bastian
7,133,531 B2 *  11/2006  Karpenstein .................. 381/119
(Continued)

FOREIGN PATENT DOCUMENTS

EP    1018724    7/2000
(Continued)

OTHER PUBLICATIONS

Bauer, Chris, "Remixing Reality—The Role of New Interfaces and the Politics of Techno-Utopianism", MA Digital Arts Thesis, Middlesex University, 1998, pp. MA4473-MA4550.
Russell, James, "Compact Disc Playback Unit With Advanced Variable Speed Control—Project Structure, Implementation & Development", Postgraduate Project in Computer Science, University of Auckland, New Zealand, Jan. 10, 1996, pp. MA001-MA0050.

Primary Examiner — Andrew C Flanders
(74) Attorney, Agent, or Firm — Barlow, Josephs & Holmes, Ltd.

(57) ABSTRACT

A music and audio playback system is implemented on a computer with a playback engine that enables the operator, typically a disk jockey, to apply a variety of effects. The system may store one or more snapshots, or a combination of settings for a plurality of controls that are applied by the playback engine. The settings that may be stored in a snapshot may be for effects, deck controls and/or mix settings. These snapshots allow for changes to settings for effects, mixing and playback to be made quickly, some of which would normally be difficult to perform. A sampler module permits a user to specify one or more samples that may be triggered for playback. The most frequently used samples may be designated as scratching files that may be quickly activated through the push of a button (or other control). A waveform display represents a window of audio samples around a current playback time. When two tracks are being played, only half of each waveform is shown. In particular, the bottom half of the waveform at the top, and the top half of the waveform at the bottom are shown. Certain effects that affect the playback of a current audio file, such as a reverse, repeat or brake effect, are performed as insert effects. As a result, the current play position in the current audio file continues to advance while the effect is performed, even thought the effect is applied to the audio data in the current audio file. The waveform display continues to update based on the continually updated current play position in the audio file.

15 Claims, 7 Drawing Sheets

U.S. PATENT DOCUMENTS

| | | |
|---|---|---|
| 7,238,874 B2 | 7/2007 | Bastian |
| 7,273,980 B2 | 9/2007 | Wardle |
| 2001/0017832 A1 | 8/2001 | Inoue et al. |
| 2003/0028516 A1* | 2/2003 | Nakata et al. ............... 707/1 |
| 2005/0275626 A1* | 12/2005 | Mueller et al. ............ 345/156 |
| 2006/0000345 A1* | 1/2006 | Yoshikawa ................. 84/616 |
| 2006/0180007 A1* | 8/2006 | McClinsey ................. 84/645 |
| 2007/0227337 A1* | 10/2007 | Yoshikawa et al. ......... 84/602 |
| 2007/0274181 A1* | 11/2007 | Yao ........................ 369/47.38 |
| 2008/0273009 A1* | 11/2008 | Goda et al. ................ 345/156 |
| 2009/0048694 A1* | 2/2009 | Matsuda et al. ............ 700/94 |
| 2009/0223352 A1* | 9/2009 | Matsuda et al. ............ 84/612 |

FOREIGN PATENT DOCUMENTS

| | | |
|---|---|---|
| EP | 1073056 | 1/2001 |
| EP | 1394791 | 3/2004 |
| GB | 2367181 | 3/2002 |
| JP | 07-029183 | 1/1995 |
| JP | 2003-114678 | 4/2003 |
| JP | 2003-233946 | 8/2003 |

* cited by examiner

MUSIC AND AUDIO PLAYBACK SYSTEM

CROSS REFERENCE TO RELATED APPLICATION

This application claims right of priority to and the benefit, under 35 USC §119(e), of prior filed provisional application Ser. No. 60/830,870, filed on Jul. 13, 2006, which is incorporated herein by reference.

BACKGROUND

One type of musical performance involves playing back recorded music and sounds in a new "mix." The performer is commonly called a disk jockey or DJ.

A disk jockey relies on many tools to create a musical performance. For example, vinyl records may be manipulated on multiple turntables, or multiple compact disks (CDs) may be manipulated, to create a variety of sound effects. The disk jockey may vary the speed, pitch, direction, and sequence of playback and may apply a variety of effects to the played back music.

More recently disk jockeys have been using tools that manipulate audio data stored in data files on computers. Some of these tools have been developed based on the idea of computerizing what is usually done with turntables and vinyl records and CD players. However, the flexibility of the computer enables new tools and techniques to be explored for use in musical performances.

SUMMARY

A music and audio playback system is implemented on a computer with a playback engine that enables the operator, typically a disk jockey, to apply a variety of effects.

For example, in one embodiment, control information for playback may be stored as a snapshot. A snapshot is a combination of settings for a plurality of controls that are applied by the playback engine. The settings that may be stored in a snapshot may be for effects, deck controls and/or mix settings. Information about the available snapshots may be provided through a user interface to permit a user to select one or more snapshots to be applied and to permit a user to activate or deactivate any selected snapshots. When a snapshot is activated, its selected settings are applied to the controls. Each snapshot can be assigned to a control, such as a MIDI notes or a key on a keyboard, to permit it to be activated quickly. Such assignments may be user-defined. These snapshots allow for changes to settings for effects, mixing and playback to be made quickly, some of which would normally be difficult to perform. It is possible to activate more than one snapshot at a time. When doing so, the last snapshot triggered will have precedence over other snapshots that might be active. A user interface is provided to assist in managing snapshots.

In another embodiment, the system includes a sampler module that permits a user to specify one or more samples that may be triggered for playback. A sample is an audio files or portion of an audio file that includes a short audio sample that a disk jockey often uses to add to a performance. When these samples are selected for playback, they are intended to bypass the controls of the mixer and are blended in directly with the mixer output. The most frequently used samples may be designated as scratching files that may be quickly activated through the push of a button (or other control). Parameters for playback of the scratching file(s), such as playback speed and volume and loop settings, may be predefined as user-definable settings associated with the scratching file. Thus the system enables direct control, at the push of a button, of the playback of a sample with external control records and CDs or MIDI rotary controllers, which simulate "scratching."

In another embodiment, a waveform display represents a window of audio samples around a current playback time. When two tracks are being played, only half of each waveform is shown. In particular, the bottom half of the waveform at the top, and the top half of the waveform at the bottom are shown. The window may be defined in terms of a playback duration, so that the waveform expands and contracts if the playback tempo slows down or speeds up. During playback, this waveform scrolls as the audio data is played, allowing the user to see when breaks and beats occur in the song. With beat markers displayed on the waveforms, if two songs have the same tempo and are in phase, then the beat markers will be vertically aligned. During the application of some effects, this waveform display may be updated as if the original audio is continuing to play forward at its regular tempo. Such effects may include, but are not limited to, switching to playback of a scratching file or repeat, reverse and brake effects. As a result, the operator can monitor the waveform display and know when to end applying the effect in a way that playback of the original audio can be restored at a desired point.

In another embodiment, certain effects that affect the playback of a current audio file, such as a reverse, repeat or brake effect, are performed as insert effects. As a result, the current play position in the current audio file continues to advance while the effect is performed, even thought the effect is applied to the audio data in the current audio file. The waveform display continues to update based on the continually updated current play position in the audio file. As a result, the operator can monitor the waveform display and know when to end applying the effect in a way that playback of the original audio can be restored at a desired point.

DETAILED DESCRIPTION

Figure 1:
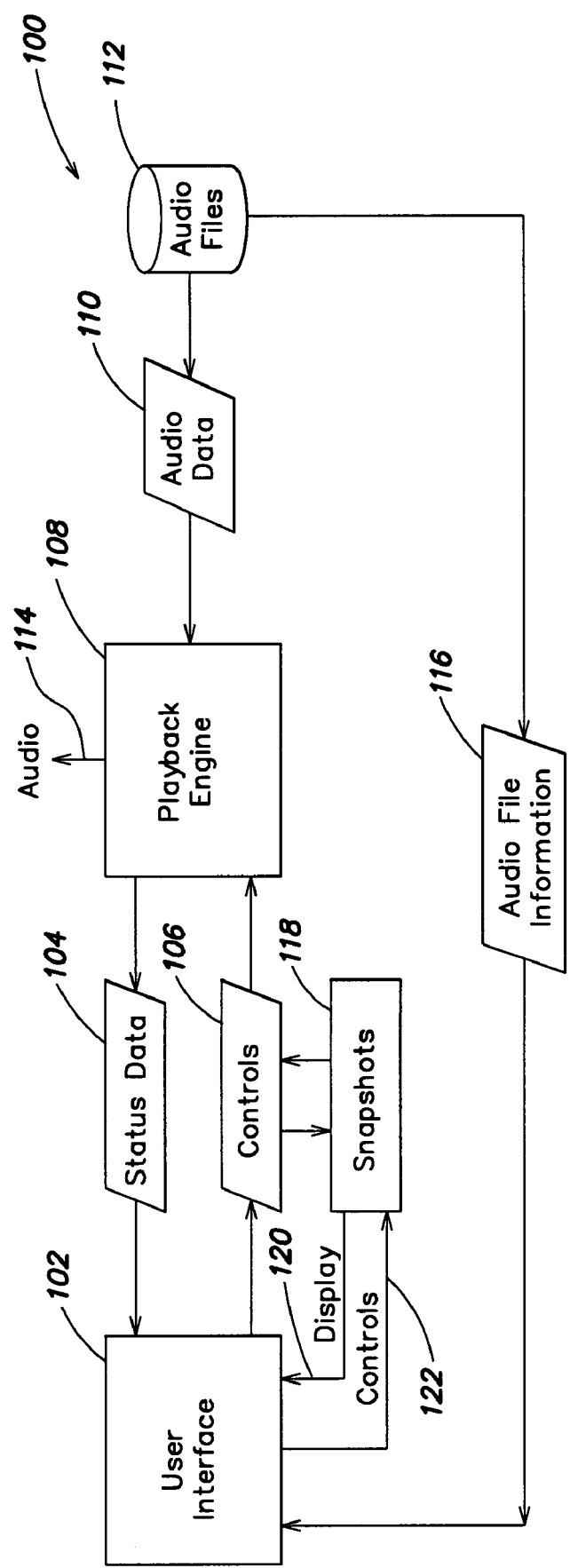
FIG. 1 is a data flow diagram illustrating an example music and audio playback system.

FIG. 1 is a data flow diagram of an example music and audio playback system 100. In this system, an individual that is controlling the playback of audio file interacts with the system through a user interface 102. The user interface typically includes one or more output devices, such as a display, through which status information for the playback system can be communicated to the user, and one or more input devices through which the user can provide input. Control elements may be displayed on the display and can be manipulated by the user through various computer input devices to provide control information to the playback system. For playback systems for disk jockeys, the user interface may include input devices for performing "scratch" manipulations, such a vinyl records, CDs, digital rotary controls (jog wheels) or other devices that allow a user to rapidly change the direction and speed of playback. In general, display information 104, such as status data, is provided to the user interface 102 from the playback engine 108 and control information 106 is provided from the user interface 102 to the playback engine 108.

The playback engine controls playback of audio data 110 from one or more audio files 112 to create an output audio signal 114 (which may be in either digital or analog form). Audio data from two or more audio files may be mixed together to generate the audio signal, and one or more effects may be applied to the audio data. Information 116 about the audio files may be provided to the user interface 102 to permit a user to select the one or more audio files to be played back. Control information 106 may include an indication of such a selection.

Some of the control information for the playback engine also may be stored as a snapshot by a snapshot module 118. A snapshot is a combination of settings for a plurality of controls that are applied by the playback engine. The settings that may be stored in a snapshot may be for effects, deck control and/or mix settings. Information 120 about the available snapshots may be provided through the user interface 102 to permit a user to select one or more snapshots to be applied and to permit a user to activate or deactivate any selected snapshots.

An overview of an example user interface for this system will now be described in connection with FIG. 2. As illustrated in these drawings, the colors have been inverted for ease of presentation; portions that are illustrated in white in the drawings are black; portions that are illustrated in gray or black in the drawings are a shade of a color or are white.

The user interface includes two deck modules, shown at 200 in FIG. 2 and described in more detail below in connection with FIG. 3. Through these deck modules, the user can control the playback of audio files. Typically, a performance would involve controlling playback of a first audio file through the first deck module, followed by controlling playback of a second audio file through the second deck module. More than two decks could be used, for example, to allow the user to mix more than two tracks simultaneously.

Figure 5:
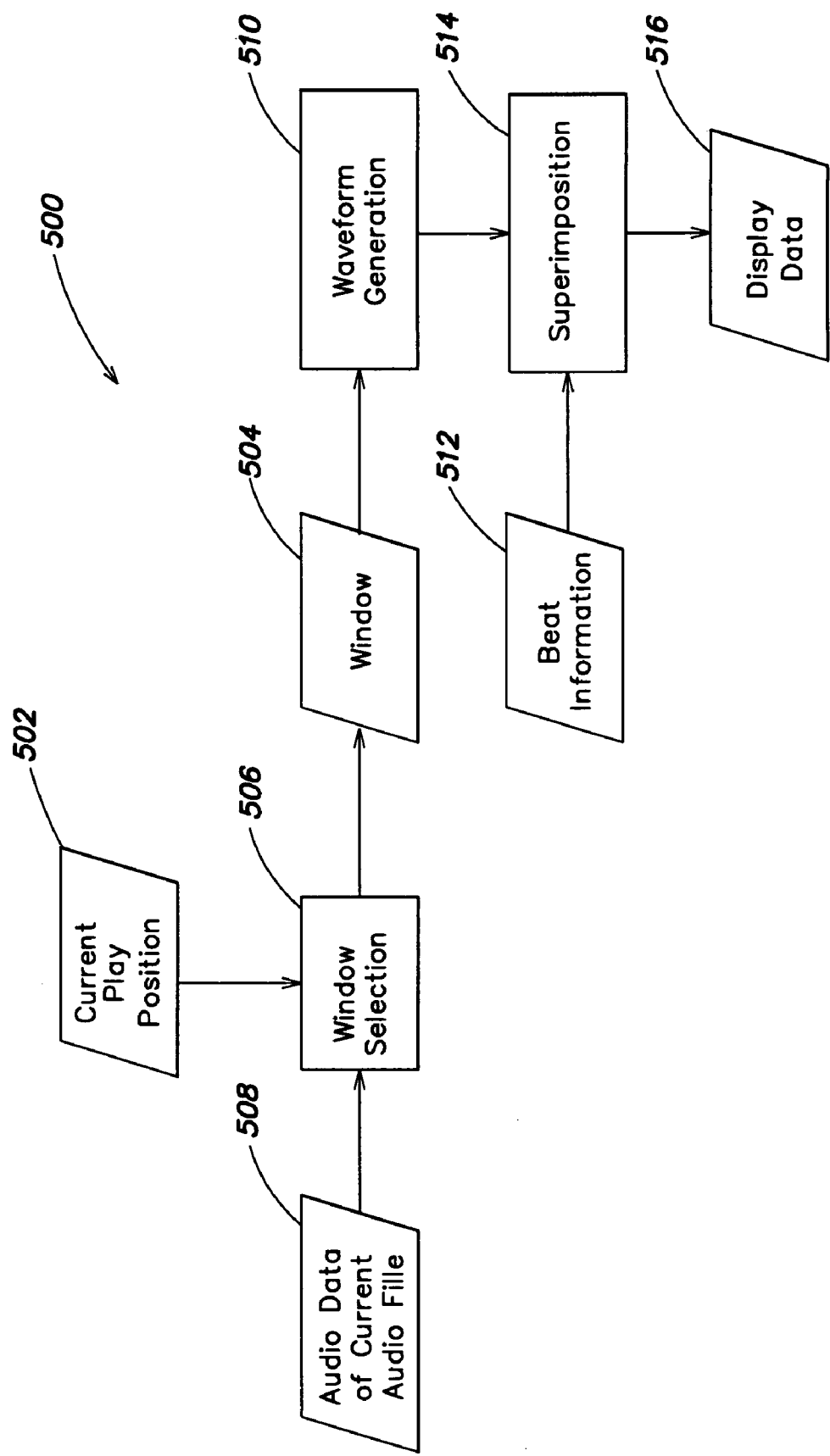
FIG. 5 is a data flow diagram illustrating an example implementation of generating the waveform display of FIG. 2.

A waveform module of the user interface, shown at 202 in FIG. 2, for which the operation is described in more detail below in connection with FIG. 5, is a display for illustrating a waveform corresponding to each deck. The waveform module may be placed in the user interface between the two decks modules. The waveform for the left deck may be shown in the top portion of the waveform display while the waveform for the right deck may be shown on the bottom of the waveform display. Superimposed over the waveforms is a "Now" line 203, indicating a current playback position within the corresponding audio (provided from the corresponding deck module). Beat markers 205 also may be provided to indicate the beat per minute and phase of the audio data.

The waveform represents a window of audio samples around the "Now" line, such as two and one half (2.5) seconds before and after the Now line. During playback, this waveform scrolls (e.g., from right to left) as the audio data is played, allowing the user to see when breaks and beats occur in the song. If scrolling is done right to left, then the part of the waveform to the left of the "Now" line represents audio data that has already been played, whereas the part of the waveform to the right of the "Now" line represents audio data that is about to be played. With the beat markers, if two songs have the same tempo and are in phase, then the beat markers will be vertically aligned.

In the waveform module, only half of each waveform is shown. In particular, the bottom half of the waveform at the top (e.g., corresponding to the left deck module), and the top half of the waveform at the bottom (e.g., corresponding to the right deck module) are shown. For the top waveform, the bottom half of the waveform may be generated from the full waveform for the audio data in several ways. For example, only the negative portion of the waveform may be shown. The polarity of the waveform may be inverted first, and then the negative portion of this inverted waveform may be shown. The waveform also may be rectified (using an absolute value function that removes polarity), and then an inverted version of the rectified waveform may be shown. For the bottom waveform, the top half of its waveform may be generated in several ways. For example, only the positive portion of the waveform may be shown or a rectified waveform may be shown.

Figure 6:
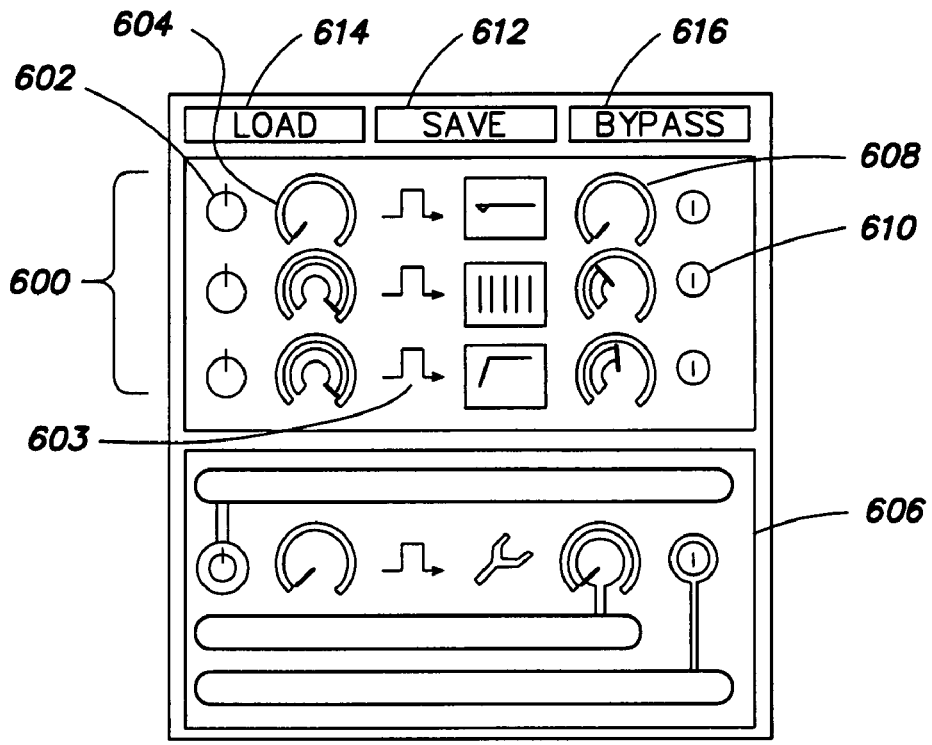
FIG. 6 is a more detailed illustration of the effects rack module in FIG. 2.

An effect rack module, shown at 204 in FIG. 2 and described in more detail below in connection with FIG. 6, is provided for each deck module. In general, the effect rack module permits the user to specify one or more effects to be applied to a signal generated by playback of the audio controlled by its associated deck module. The effects that can be applied are any type of audio effect, for example, including but not limited to, external plug-ins and a library of insert or send-style effects.

A mixer module, shown at 206 in FIG. 2 and described in more detail below in connection with FIG. 7, permits a user to control the blending of the audio signals generated through playback by the deck modules and audio signals from external sources into one stereo stream (the Master). In this example interface, the mixer module appears between the effect rack modules and below the waveform module.

Figure 2:
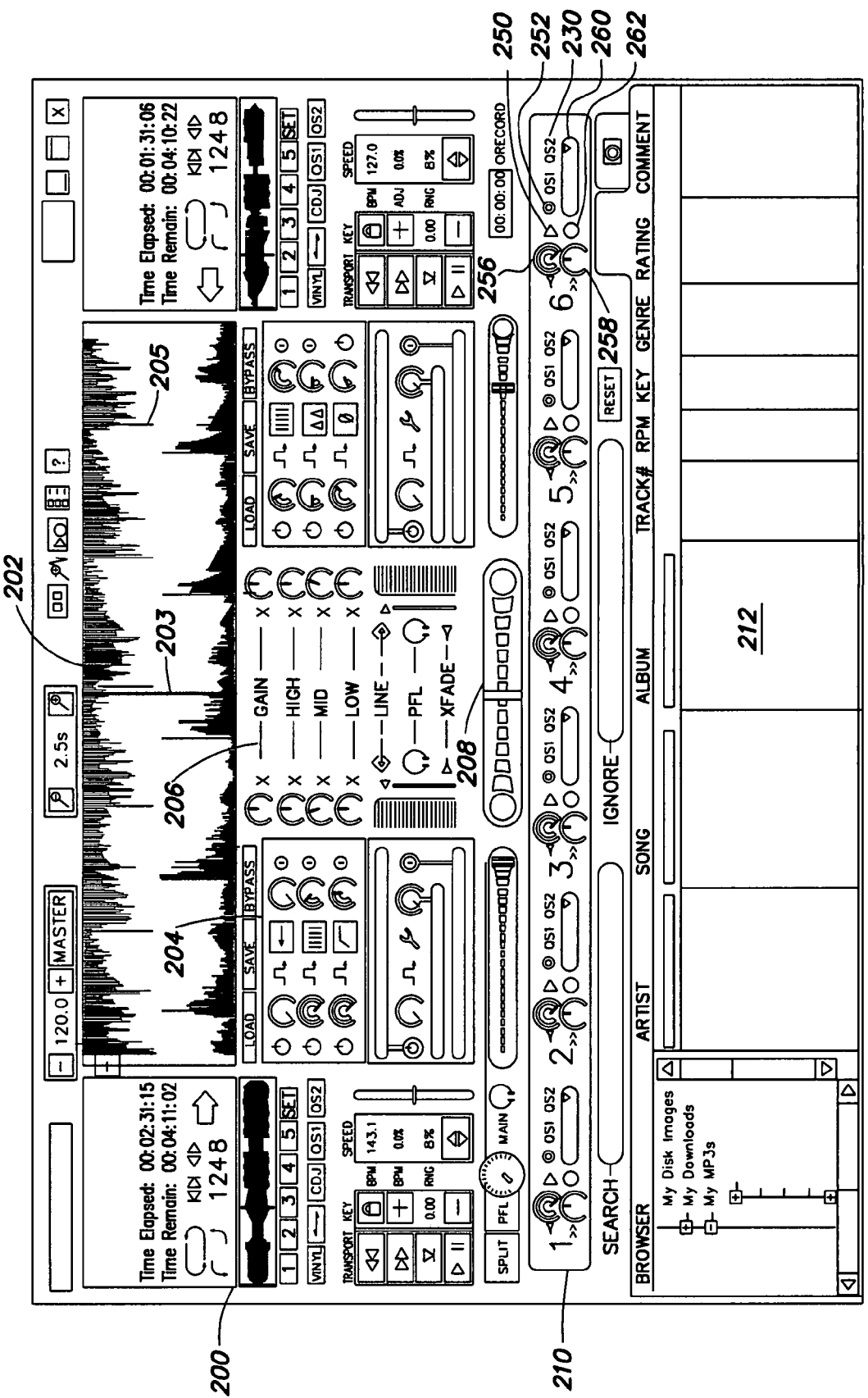
FIG. 2 is an illustration of an example graphical user interface for a music playback system.

A crossfader module, shown at 208 in FIG. 2, enables the user to control fading between two channels of the mixer. If the crossfader is on the left, then the signals controlled by the left deck module will be heard. If the crossfader is on the right, then the signals controlled by the right deck module will be heard. Placing the crossfader in between will result in a blend of the signals controlled by the deck modules.

A sampler module, shown at 210 in FIG. 2, permits a user to specify one or more audio files (or portions of audio files) that may be triggered for playback. The sampler module permits a user to load short audio samples from disk or record audio samples in real-time. When these samples are selected for playback, they are intended to bypass the controls of the mixer and are blended in directly with the mixer output.

Each sample slot is numbered and has one or more buttons for indicating that the sample slot refers to a scratching file that can be used for scratching through one of the deck modules. The number of buttons available depends on the number of scratching files that can be designated. Among all sample slots, only one sample slot may have its first button activated; similarly, among all sample slots, only one sample slot may have its second button activated. If the button in the sample slot is deactivated during playback of its corresponding scratching file by a deck module, playback of the original audio file played by that deck module will be restored. If the assignments of the sample slots to scratching are changed by the user through the sampler while the deck module is using the scratching file, playback switches from the original scratching file to the newly selected scratching file.

Each sample slot has a trigger button 250. The user may press this button to cause the associated sample to play. A volume knob 256 enables the user to control the volume of playback of the sample. A speed knob 258 enables the user to control the playback speed of the sample. A loop button 262 enables the user to specify that the sample is a loop sample. A sample name window 260 displays the name of the sample file loaded into the slot. Additionally, the background of this window may be used, for example, as a progress meter to illustrate how much of the sample has been played. The sample name window, or other element, may be used to activate a menu that permits a user to load a sample into a slot, save a sample from a slot, load and save banks of samples.

A record button 252 enables the user to record a sample. The recording process involves first selecting a sample source. For example, the user may designate a source by selecting the cue button in the mixer module. After the record button is pressed by the user, a new sample is recorded and associated with that slot. When the record button is pressed again, recording stops. To record a loop, an additional key, such as a shift key, is pressed along with pressing the record button. Instead of beginning recording immediately, recording waits for a downbeat in the source material. Downbeats can be detected using appropriate beat detection processing. Once recording, clicking the record button does not stop recording immediately. Instead, recording continues until the end of the next bar. Once the end of the bar is reached, recording stops, thus creating a perfect sample for looping.

A music database module, shown at 212 in FIG. 2, also may be provided, in this example at the bottom of the user interface, which permits users to search a file system and/or a database to locate audio files. Various search parameters could be used to index and search for audio files, such as beat-per-minute (BPM) range, style, key, rating, comments, artist, song name, album name, and others.

A snapshot module (not shown in FIG. 2) also may be provided, and occupies the same space as the music database. Switching between display of a music database and the snapshot module may be caused, for example, in response to the user pressing a key, such as a "tab" key. The purpose of this module is to store combinations of settings for various controls and to permit their instant recall during a performance. Such settings may be parameters for effects set in the effects rack module, deck controls set in the deck module and/or mix controls set in the mixer module. For example, a snapshot may contain EQ settings that will make a song sound like it is being played through a telephone. Another snapshot could contain effects routing settings which can add distortion to a track. These snapshots can be assigned and managed, through this interface, to MIDI notes or keys on the computer keyboard. An example snapshot module is described in more detail in connection with FIG. 8.

Various other controls also can be provided. More example, a master volume controls (implemented for example with a slider and activation button) permit a user to control the volume of the master signal. The master signal also could be recorded, with control of such recording provided through an activation button in the user interface.

Another control can be provided to adjust a global tempo. A global tempo is a tempo to which the deck modules and sampler module may synchronize. Using a global tempo avoids problems of making the deck modules synchronize to each other and permits an external input to control the global tempo to which playback of audio is synchronized.

Figure 3:
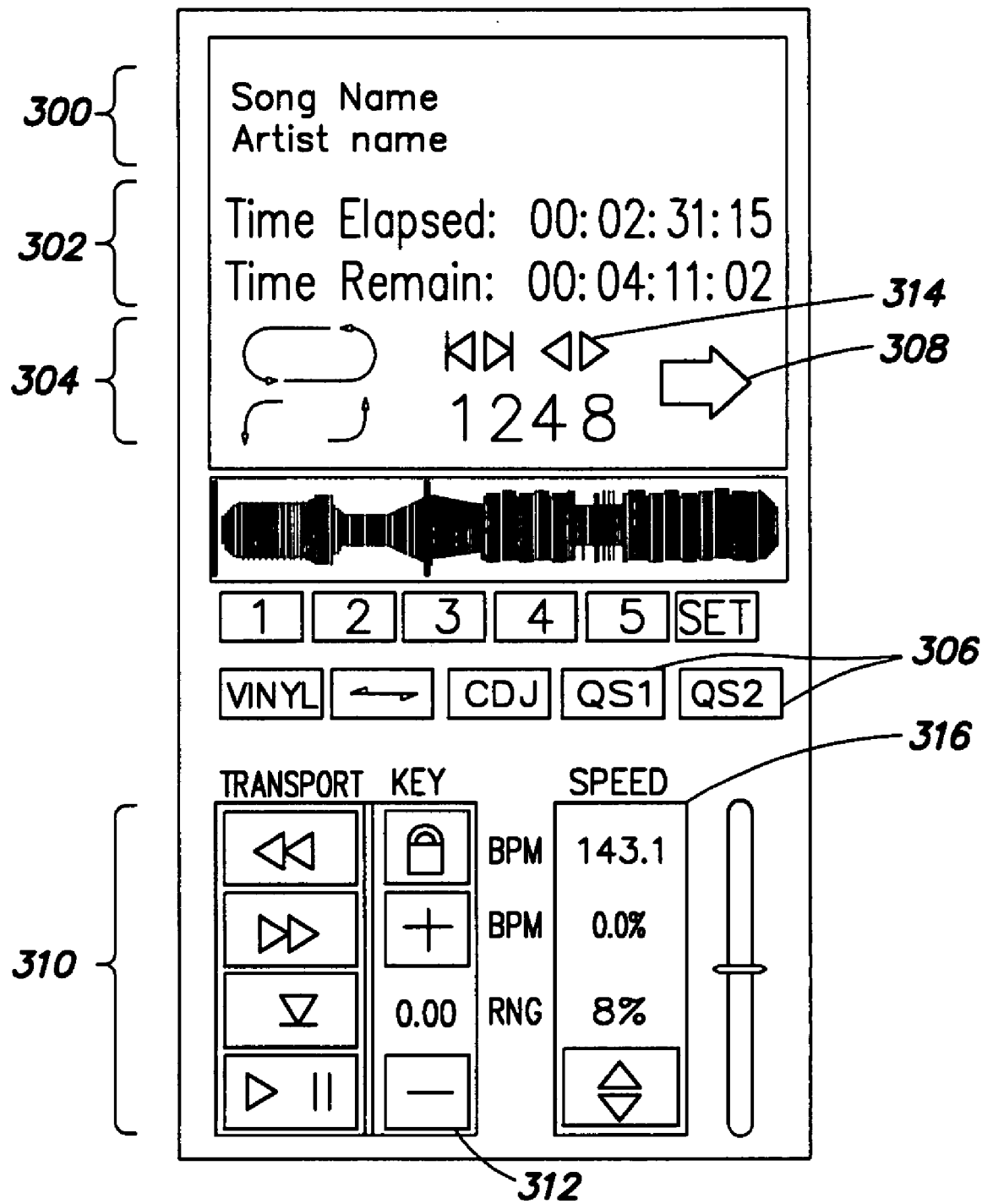
FIG. 3 is a more detailed illustration of the deck module in FIG. 2.

Referring now to FIG. 3, an example deck module will now be described in more detail.

The deck module displays various information 300 about the audio file assigned to that deck module for playback. Such information may include, for example, a name of a song and an artist name (which may be taken from the ID3 tag of a file), or a file name of the audio file. During playback, status information 302 also may be shown. Such status information may include, for example but not limited to, the current cue or play location within the audio file, and the time remaining in the audio file. The time remaining is the duration of the audio file minus the current time. Time may be expressed in any suitable format, such as hours, minutes, seconds, and frames (e.g., 30 frames per second). In such a case, if the current play location is at the beginning of the audio file, then the current time will be 0:0:0.0 and the time remaining will be the duration of the audio file.

One of the control functions available through the deck module allows the operator to quickly replace the current song being played through a deck module with select samples managed through the sampler module. For example, there are a few common sounds, like "Aaaah" and "Fresh" that are often used in scratching. Instead of searching through the music database to find such sounds, they can be identified using the sampler module (210 in FIG. 2) as scratching files, as described above. One or more scratching buttons 306 may be provided for each deck module. These buttons correspond to the audio files selected as scratching files set through the sampler module. An operator selects a scratching file identified in the sampler module by pressing its corresponding scratching button 306 in the deck module. The deck module stores the location in the current audio file that is being played, and then plays the selected scratching file instead. When playback of the scratching file is disabled, e.g., when the scratching button is pressed again, playback of the original audio file is restored to its last position. Alternatively, the playback position in the original audio file can continue to advance while the scratching file is being played. The waveform display can behave as if the original audio file was still being played. Such an implementation is described in more detail in connection with FIG. 4.

Some looping controls also are provided at 304. For example, a loop in button is provided to permit a user to insert a "Loop In Marker" at the current play location in the audio file. Similarly, a loop out button may be provided to permit a user to insert a "Loop Out Marker" at the current play location in the audio file. It may be implemented such that loop playback is engaged when the loop out marker is set, causing playback to jump back to the Loop In Marker. If either marker is currently at a different location in the audio file when this button is pressed, the marker is moved to the new location. As a default position, the loop in marker may be set to the beginning of an audio file, whereas the loop out marker may be set to the end of the audio file. These markers also may be placed at the beginning of the nearest transient in the audio data. A loop button may be provided, for example as a toggle button, which turns looping on and off. If looping is active, then the current play location will jump back to the loop in marker any time playback reaches the loop out marker. If looping is not active, then the loop markers are ignored during playback. If the loop button is activated when the current play position is not between the loop in and loop out markers, playback jumps back to the loop in point.

The numbered buttons (1, 2, 4, and 8) allow the DJ to instantly loop a preset length of a file with the single press of a button. By default, each of the 4 buttons represents a bar length. If the operator presses the [1] button, a Loop In Marker is placed at the current play location followed by a Loop Out Marker 1 bar later. The [Loop] button is switched on and playback of the audio loops until the [Loop] button is pressed to turn it off. The length of time represented by each button (1 bar or 1 beat) can be user defined. If, while a loop is being captured, pressing the same loop button again cuts the loop length in half. If, while a loop is being captured, pressing the same loop button again simultaneously with another key, such as the shift key, doubles the loop length. A "pre-looping" function, which creates loops going backward into the audio file, can be implemented in a similar manner. For example, if the operator presses a [shift] key and the [1] button, a Loop Out Marker is placed at the current play location preceded by a Loop In Marker 1 bar earlier. When a pre-loop is created, playback jumps immediately back to the loop start point.

A sync button 308 also may be provided to enable the user to synchronize playback of the audio file with playback by another deck or external device. For example, the first deck module may receive beat per minute and phase information for playback of an audio file by the other deck. The first deck module then matches its beat per minute and phase information to that from the other deck module. While in this mode, any changes in speed to the second deck module are matched by the first deck module. Synchronization to an external device may be implemented, for example, using "ReWire" technology from Propellerhead. Using the ReWire technology, the global tempo is set to the beat and tempo information received from a ReWire host. The deck modules then synchronize themselves to the global tempo.

There are several typical playback navigation or transport buttons 310 to permit the user to control playback, such as a start and stop button, forward and backward seek buttons, and a cue button. The cue button has two functions depending on the current playback state of the deck module. If playback is paused, pressing and releasing the cue button will set the cue point to the current play location. If audio data is playing, pressing and releasing the cue button will pause playback and move the play position back to the cue point.

Playback speed control buttons called nudge buttons and offset buttons 314 also may be provided. The nudge buttons work similarly to the pitch bend buttons found on DJ CD players. These buttons temporarily change the playback speed so that the DJ can align the song with another. The offset buttons make the current play position jump forward or back by 1 beat-length. Yet other controls 312 may be provided to adjust the key, or pitch, of the audio played back by the deck, and/or to enable or disable pitch-shifting/time-stretching processing.

The display also may include beat-per-minute display and controls 316. This display shows the current playback beat per minute even if it is different from the original recorded beat-per-minute. A slider is provided to permit the user to adjust the playback tempo within a specified percentage of the original tempo. The tempo adjustment range of the slider is shown next to the slider. This range may be user defined.

Figure 4:
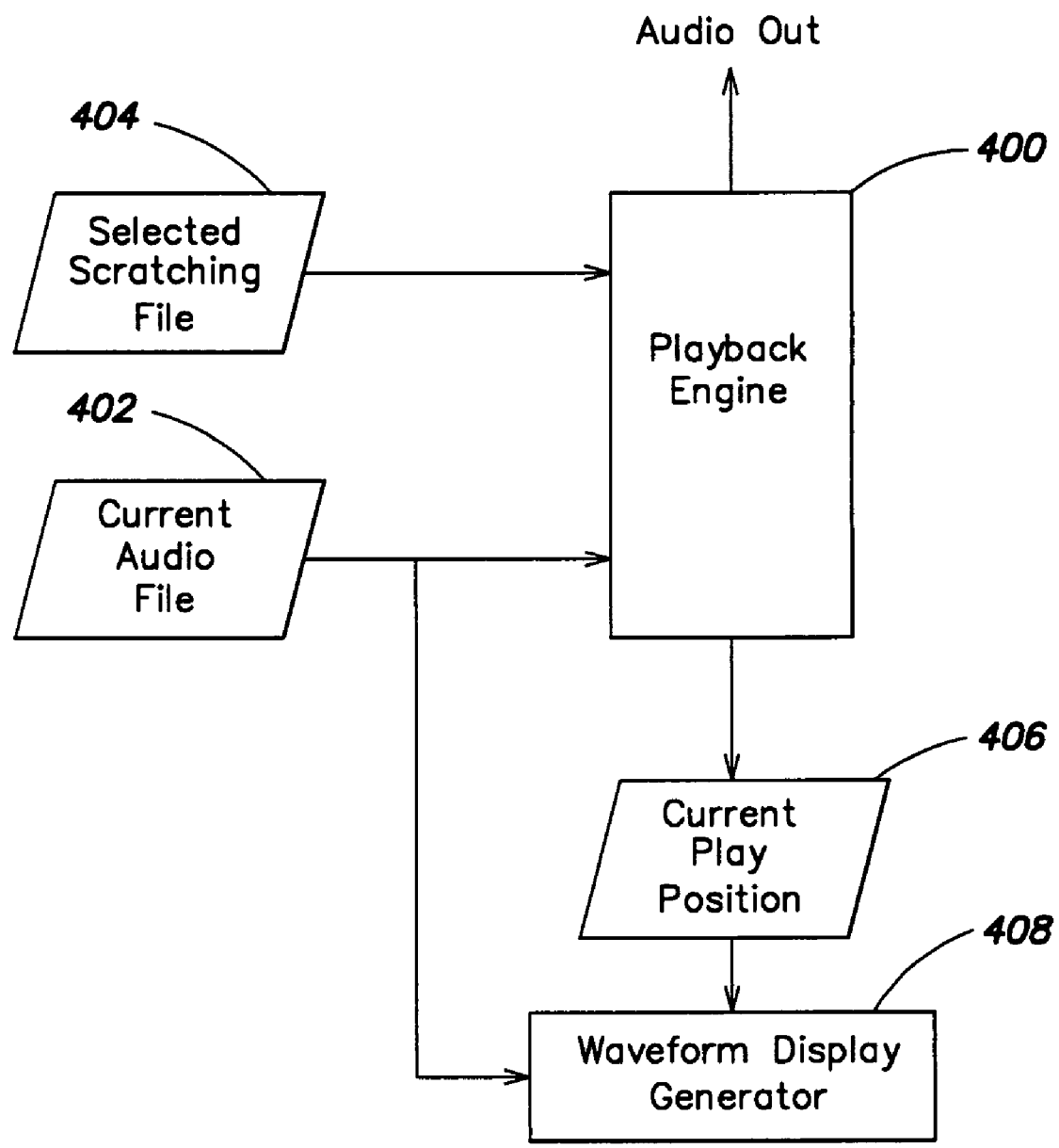
FIG. 4 is a data flow diagram illustrating an example implementation of handling scratching files.

Referring now to FIG. 4 an example of the operation of the scratching function, invoked by selection of the scratching buttons 306 shown in FIG. 3, will now be described in more detail through a data flow diagram. In this example, a playback engine 400 receives audio data from the current audio file 402 being played by the deck module, and audio data from the selected scratching file 404. The playback engine increments its current play position 406 while playing from the current audio file. In one implementation, when the user activates playback of the scratching file, the playback engine switches to reading audio data from the scratching file, but continues to separately increment the current play position 406. The playback engine continues to provide the current play position to the waveform display generator 408 for generating the waveform display, which is still based on the current audio file 402 while the scratching file is playing. Playback of the scratching file continues until the user disables the scratching playback mode (by deactivating the scratching buttons 306 on the deck module). The playback engine then switches over to playing back the current audio file using the updated current play position. By continuing to update the waveform display in this manner, the operator can monitor the waveform display and know when to end applying the effect in a way that playback of the current audio file can be restored at a desired point. This technique also can be used during application of some effects, such as the repeat, reverse and brake effects described below. Alternatively, the stored last play position of the current audio file may be used if the playback engine does not continue to increment the current play position during playback of the scratching file or application of an effect.

Referring now to FIG. 5, a data flow diagram illustrating an example implementation the waveform display generator will now be described. The waveform display generator 500 receives the current play position 502 from the playback engine (not shown) for a deck module. A window of audio samples 504 around the current play position, such as two and one half (2.5) seconds before and after this position, from the audio data 508 of the current audio file (but not a scratching file) being played by the deck module is accessed by window selection 506. Because the window is based on an amount of playback time, the tempo information 512 is used to determine the window size. Slowing down playback stretches out the waveform; speeding up playback squeezes the waveform. This window of audio samples is processed as described above by waveform generation 510 to generate a half waveform for each deck module. Based on tempo information 512, the beat markers are placed on the waveform (by superimposition 514) to provide the display data 516. This display data is displayed, centered on a "Now" line indicating the current playback position.

Figure 7:
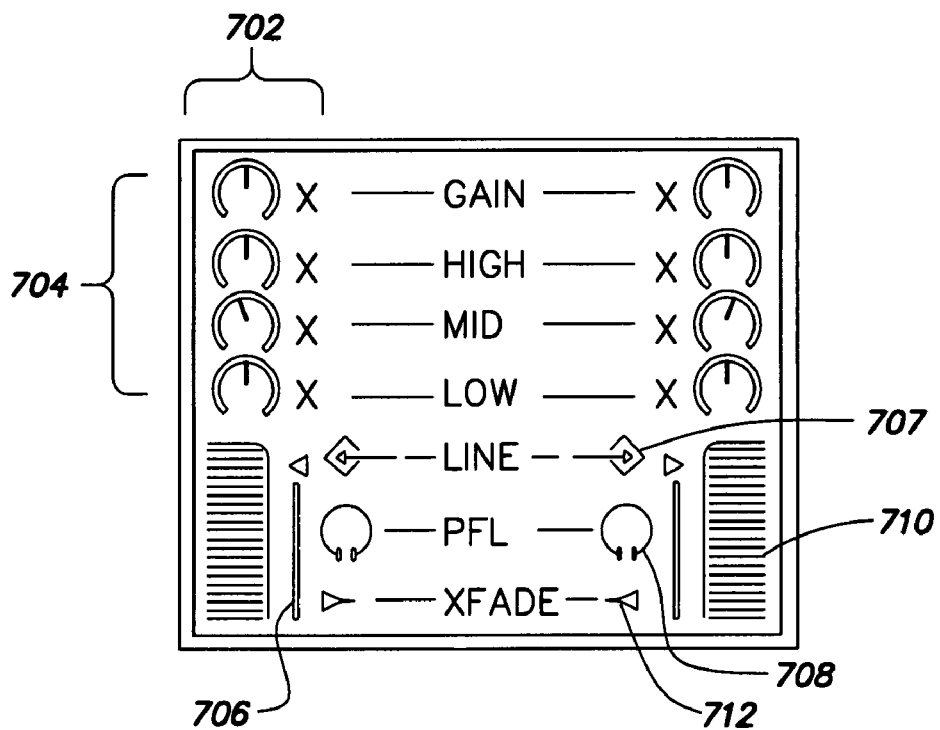
FIG. 7 is a more detailed illustration of the mixer module in FIG. 2.
Figure 8:
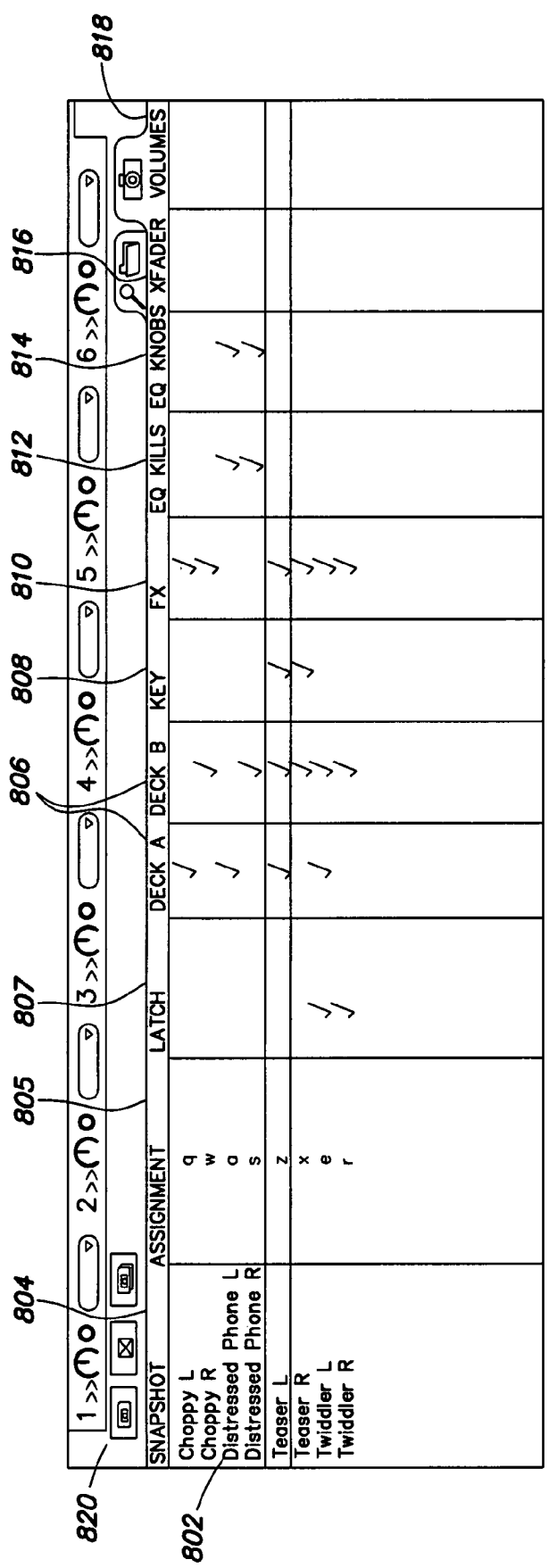
FIG. 8 is an illustration of an example snapshot module.

Referring now to FIGS. 6-8 the effect rack, mixing and snapshot modules will now be described in more detail.

Referring to FIG. 6, the effect rack module permits a user to access internally defined effects and effects defined through a plug-in architecture and to select from among them to apply effects to one stereo audio stream. Each deck module has an associated effect rack module, allowing the audio data controlled through each deck module to be processed by unique effects. The effect rack module can make available several effects from a collection of built-in effects. Additionally, the DJ can select from among externally-defined effects that are accessed through a plug-in architecture, such as VST plug-ins. In the implementation shown in FIG. 6, an effect rack module has three slots, each of which host one internal effect, and one slot that represents an externally defined effect.

Effects generally are applied in one of two ways: as an insert effect or as a send effect. An insert effect is characterized by the fact that all of an audio signal is processed and replaced with a new signal generated by the effect. Thus, all of the audio from the deck module, and any effects in a chain of effects before an insert effect, are replaced by the output of the insert effect. Send effects, on the other hand, leave the original audio signal as is and mixes it with the new signal generated by the effect. Whether an effect is an insert or send effect may be implemented to be individually selectable for each slot.

The effect rack module has a top portion that includes a number of slots 600, each of which represents a built-in effect. A bottom portion includes a slot 606 which represents a plug-in effect. Within each slot (whether for a built-in effect or plug-in), there is an enable button 602 which permits the user to enable or disable use of the effect. A bypass button 616 enables or disables the entire effect rack. A routing button 603 permits the user to specify whether the effect is an insert effect or a send effect.

A mix knob 604 function depends on the type of the effect. For insert effects, the mix knob is used to adjust the mix of the effect. When the knob is fully counter-clockwise, only the original audio signal will be heard, as if the effect was bypassed. When the knob is fully clockwise, only the output of the effect will be heard, thus becoming a full insert effect. When the knob is at 12 o'clock, an even mix of the original and the effect will be created. For send effects, the knob defines a send amount. When fully clockwise, the full input signal is fed to the input of the effect. When fully counter-clockwise, the signal feeding the effect input is silent.

Each effect slot also has one or more assignable parameter knobs 608 and one or more assignable parameter buttons 610. The knob can be used to control one of the effects parameters that has a range of values. The button can be used to control a button-type control in the effect. A set of effects can be saved as a preset file. The save button 612 permits a user to save a preset file. The load button 614 permits a user to request retrieval of a preset file.

Referring now to FIG. 7, the mixer module is one mixer that is used to mix the signals from the one or more deck modules and optional external audio sources. The mixer contains one block for each deck module that is active. The mixer includes a gain knob and button 702, high, mid and low knobs and buttons 704 (called EQ knobs and EQ kill buttons) for each deck. The buttons for the EQ remove the associated frequency range from the output.

A channel volume fader 706 is a vertical fader that is used to adjust the output volume of the associated channel. A line input selector 707 allows the user to select external audio instead of the deck module. A cue button 708 is provided to permit a user to select the associated channel as the input source to a headphone output. In general, the cue buttons are mutually exclusive—pressing one button will deactivate the other. Thus, only one channel can be selected as the headphone cue source at a time, but this behavior may be user-controllable.

Graphical volume meters 710 also are provided to show the signal level of an individual channel. Crossfader assignment buttons 712 also are provided for each channel. In an implementation with only two deck modules, pressing the button switches the assignment of the deck modules to the left or right inputs of the cross fader. The default has the left deck module applied to the left input of the crossfader and the right deck module applied to the right input of the crossfader. With more than one deck module, a deck module may be either off, or applied to either the left channel of the crossfader or the right channel of the crossfader. If a user attempts to apply two deck modules to the same input of the crossfader, the most recently selected deck module is applied to the crossfader and the other deck module is set to off.

Referring now to FIG. 8, the snapshot module allows the user to save, modify and otherwise access "snapshots" of the current settings in the effect rack module, in the deck module and in the mixer. The snapshot module occupies the same space in the user interface as the music database module. The user may toggle between the two views using a predefined input. The snapshots can be triggered via computer keyboard or external MIDI control. These snapshots allow for changes to settings for effects, mixing and playback to be made quickly, some of which would normally be difficult to perform.

Various effect parameters may be saved in a snapshot, for example but not limited to: EQ Kills, EQ Knobs, FX Knobs, FX Plug-in, Key Adjust, crossfader and mixer volumes. A snapshot contains values for all of the available settings. However, it is not always desired that every setting in the program be overridden by a snapshot. A DJ may only want to change a couple elements of the program. The snapshot module therefore represents each snapshot as a row, with a column for each setting. Each resulting box has a check box which the user may activate or deactivate. These check boxes indicate which elements of the snapshot will be used when the snapshot is triggered. Therefore, if only the X-Fader column is checked, for example, only the settings of the crossfader would be changed when the Snapshot is triggered. All other elements will remain untouched.

Furthermore, it is possible to activate more than one snapshot at a time. When doing so, the last snapshot triggered will have precedence over other snapshots that might be active. For example, the first snapshot triggered may have both EQ Kills and Key checked. The second snapshot may only have Key checked. In this case, if the user triggers the first snapshot followed by the second snapshot, the EQ Kill settings from the first snapshot and the key settings from the second snapshot are used. The user can trigger as many snapshots simultaneously as desired, but only the latest checked settings are used.

To help emphasize this precedence rule in the user interface, the check marks for an active snapshot are turned a different color, such as bright green. If another snapshot is triggered that has elements that override the contents of this snapshot, then overridden check boxes turn to another color, such as red. Therefore, when multiple snapshots are active, the user is able to see which snapshot elements are in use and which are overridden.

In the example snapshot list in FIG. 8, this list displays saved snapshots. Each item 802 in the list is broken into columns. The snapshot column 804 includes a user defined name of the snapshot. The assignment column 805 shows the key or MIDI assignment currently linked to the snapshot. The key also may be user-defined. The snapshot will be active any time the assigned key is held and will become deactivated when the key is released, except if the latch column 807 is checked. If the latch column is checked, then the snapshot is active until the assigned key is pressed a second time.

The deck columns 806 indicate which deck, and its associated components, that will be affected by the snapshot. The key column 808 indicates whether the key adjust settings for the decks will be overridden by the settings within the snapshot. The FX column 810 indicates whether the knobs and buttons in the FX modules will be overridden by the snapshot when active. The EQ Kills column 812 indicates whether the snapshot's EQ kill state overrides the current EQ kill state when the snapshot is active. The EQ Knobs column 814 indicates whether the state of the EQ knobs stored in the snapshot override the current settings. The Xfader column 816 indicates whether the settings of the crossfader module (the crossfader position, crossfader curve, and transform buttons) are overridden by the settings stored in the snapshot. Finally, the volumes column 818 indicates whether the levels of the decks within the mixer module will be overridden by the settings saved in the snapshot. Other control buttons 820 allow a user to create new snapshots, duplicate existing snapshots or delete snapshots.

The effects module may include some predefined effects that a user can select and place into slots in the effect rack module. Such effects may include, but are not limited to, a delay, reverb, flanger, phaser, dual-filter, distortion and strobe. Three particular example effects, reverse, repeat, brake, shuffle and drummer, will now be described in more detail.

A reverse is a common remix technique with vinyl records and CDs that involves reversing playback of a song. It is often used to introduce a new part of a song. What is desired is to reverse playback some time, e.g., one bar, before the chorus of a song, and then play the chorus. However, with vinyl records or CDs, simply reversing the direction of playback then reverting back to forward playback does not have the desired results. The reason is that, after reverse playback, simply changing the direction of playback will cause the song to be in the wrong position when forward playback is resumed. For example, if reverse is engaged one bar before a chorus, then when the reverse is disengaged the song will now be two bars before the chorus, which is not desired.

This undesired behavior can be prevented by playing the song backwards while maintaining forward transport by the deck module. In particular, if the user engages the reverse effect, the associated file is played in reverse; however, the deck module and waveform displays behave as if playback is forward. When the user disengages the reverse effect, playback will resume in the forward direction at the current play location from the deck module. Thus, the behavior of deck module, the current play location and waveform module during a reverse operation is similar to the behavior during playback of a scratching file. Thus, using the example above, when the user engages the reverse effect one bar before a chorus, the file is played backwards for a bar while the deck module counts forward for the same amount of time. Then, when the reverse is disengaged one bar later, the play location is now at the downbeat of the chorus, not two bars before it.

When the reverse effect is active, the deck module still responds to scratch manipulations. However, since the audio is reversed, the scratch will be backwards, i.e., scratching forward will result in the audio moving backwards while scratching backwards makes the audio move forward. The reverse effect is implemented as an insert effect. The remaining controls for the effect rack module have no function during a reverse, other than the parameter button which turns the effect on and off.

A brake is another remix technique that involves slowing down forward playback to a complete stop over some duration of time. The parameter for the brake effect is the duration over which the playback will slow down. When the brake effect is turned off, the deck module resumes playback as if it had kept playing all along. Thus, the behavior of deck module, the current play location and waveform module during a brake effect is similar to the behavior during playback of a scratching file. The brake effect is implemented as an insert effect. The enable button and mix knob in the effect rack module have no function. The parameter knob sets the speed at which the brake will occur. When the knob is turned fully counter-clockwise, the brake speed will be quick—it will take a short amount of time for the song to reach a complete stop. When the knob is turned clockwise, the brake time will increase. The parameter button is used to activate and deactivate the brake effect.

A repeat is another remix technique that involves repeating a small section of the audio file while playback still proceeds in the deck module. Therefore, this effect works not by sampling a section of the audio and repeating it, but by actually controlling the playback position within the file while the deck module continues to count musical time as normal. This allows musical time to progress while repeating only a portion of a file. Thus, the behavior of deck module, the current play location and waveform module during a repeat operation is similar to the behavior during playback of a scratching file. The repeat effect is implemented as an insert effect. The enable button is used to activate and deactivate the effect. The mix knob is used to set the mix between the original (dry) signal and the repeated (wet) signal. The parameter knob sets the size of the audio slice being repeated. For example, when the knob is fully counter-clockwise, the slice size may be two bars in size. When the knob is fully clockwise, the slice size may be $\frac{1}{256}$-note. As the knob is turned from minimum to maximum, the slice size will change and will "re-seed" the repeat effect, as if the user had turned the effect off and on again instantaneously. Pressing this button captures the current section of the song on the deck for repeating.

The drummer is another effect that works by changing the playback location within a file while playback still proceeds normally in the Deck module. The effect works by offsetting the current playback location in steps (such as 16'h-note or eighth-note steps) allowing the DJ to create new rhythms from the original song. If you consider 1 measure of music being broken into 16 steps, the DJ could play in a sequence of steps that results in playback pattern of 1, 4, 3, 3, 15, 16, 7, 8, 7, 8, 4, 11, 13, 1, 12, 9. Since the Deck continues to play forward normally while this effect is in use, disabling the effect will cause the music to jump ahead to its proper location and continue playback.

The shuffle effect is similar to the drummer effect, above, in that it rearranges the playback order of a measure of music by breaking a measure into smaller steps. In contrast to the drummer effect, the shuffle effect imposes preset offset patterns to the music as opposed to being played in real-time like the drummer effect. The shuffle effect may contain multiple preset patterns that the user can choose to edit and activate. The patterns play back at a tempo that is synchronized with the tempo of the associated Deck or the Global Tempo.

Another feature that can be provided for use when the controller is implemented using a vinyl record is skip protection. Skip protection prevents audio gaps and/or glitches from occurring in the event that the stylus should skip on the record. The system continuously monitors the speed of the record. If the speed instantaneously drops to zero, then the system infers that the stylus has come off the record. The system continues to playback the audio for a fixed period of time, such as 0.5 seconds, at the last used playback speed. If the stylus comes back into contact with the record within that period of time (determined by the monitored playback speed), then vinyl control of playback continues. In this manner, audio gaps or glitches are minimized.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. For DJ applications, input devices also may include MIDI controllers, vinyl record or CD-based scratching controllers, and other input devices typically found in audio consoles. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in the various figures may be separate modules of a computer program, or may be separate computer programs, -or may include separate modules or programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A music and audio playback system, comprising:
   a playback engine for playing audio data according to control information, wherein the control information includes one or more parameters affecting playback of the audio;
   at least two deck modules, each deck module enabling a user to select a current audio file to provide audio data to the playback engine;
   a module for mixing audio data from the at least two deck modules;
   a sampler module for identifying one or more samples, and for designating at least one sample as a scratching file; and
   a memory for storing values of the one or more parameters that define a snapshot, wherein the snapshot can be recalled and applied by activating a single control, and wherein the playback engine enables the user to play audio data according to one or more deck controls, wherein each deck control is defined by one or more deck control parameters, and wherein the snapshot includes values of at least one deck control parameter that controls playback speed of the audio data.

2. The music and audio system of claim 1, wherein the at least one deck control parameter that controls playback speed of the audio data temporarily changes playback speed.

3. A music and audio playback system, comprising:
   a playback engine for playing at least two tracks of audio data, wherein the playback engine provides a current playback time indicative of a current play position within each track of audio data; and
   a waveform display that displays a half waveform for each of the at least two tracks of audio data, wherein a first one of the half waveforms is inverted and is displayed in temporal alignment with a second one of the half waveforms, and wherein each half waveform represents a window of audio samples around the current playback time, wherein the playback engine may apply one or more effects, wherein application of the one or more effects replaces normal forward playback of one or more of the at least two tracks of audio data; and
   wherein the waveform display updates during application of the one or more effects as if normal forward playback of the replaced one or more tracks of audio data is occurring.

4. The music and audio playback system of claim 3, wherein the one or more effects includes a reverse effect.

5. The music and audio playback system of claim 3, wherein the one or more effects includes a repeat effect.

6. The music and audio playback system of claim 3, wherein the one or more effects includes a brake effect.

7. The music and audio playback system of claim 3, wherein the one or more effects includes a drummer effect.

8. The music and audio playback system of claim 3, wherein the one or more effects includes a shuffle effect.

9. A music and audio playback system, comprising:
   a playback engine for playing audio data according to control information, wherein the control information includes values of a plurality of parameters, each of the plurality of parameters controlling an aspect of playback of the audio;
   at least two deck modules, each deck module enabling a user to select a current audio file to provide audio data to the playback engine;
   a module for mixing audio data from the at least two deck modules;
   a sampler module for identifying one or more samples, and for designating at least one sample as a scratching file;
   a user interface for enabling an operator of the system to select one or more of the plurality of parameters to define a snapshot, wherein at least one of the selectable parameters controls playback speed of the audio data; and
   a memory for storing values of the one or more selected parameters as a stored snapshot, wherein the snapshot can be recalled and applied by activating a single control.

10. The music and audio playback system of claim 9, wherein the stored snapshot includes a value of at least one parameter pertaining to mixing the audio data from the at least two deck modules.

11. The music and audio system of claim 9, wherein the stored snapshot includes a value of at least one effect parameter pertaining to applying effects to audio data from at least one of the two deck modules.

12. The music and audio system of claim 9, wherein the stored snapshot includes a value of at least one deck control parameter.

13. The music and audio system of claim 9, wherein the user interface further enables the operator to define a plurality of snapshots including the first-mentioned snapshot by selecting one or more of the plurality of parameters for each of the plurality of snapshots.

14. The music and audio system of claim 13, wherein the user interface further enables the operator to select a plurality of snapshots at a time for controlling playback.

15. The music and audio system of claim 14, wherein, if a parameter is defined in more than one of the selected plurality of snapshots, playback is controlled by a parameter value corresponding to one of the selected plurality of snapshots according to a predefined snapshot precedence.

\* \* \* \* \*